Aug. 26, 1930.  F. J. WERNER  1,774,306
CONTINUOUS HEATING FURNACE
Filed March 17, 1926   5 Sheets-Sheet 1
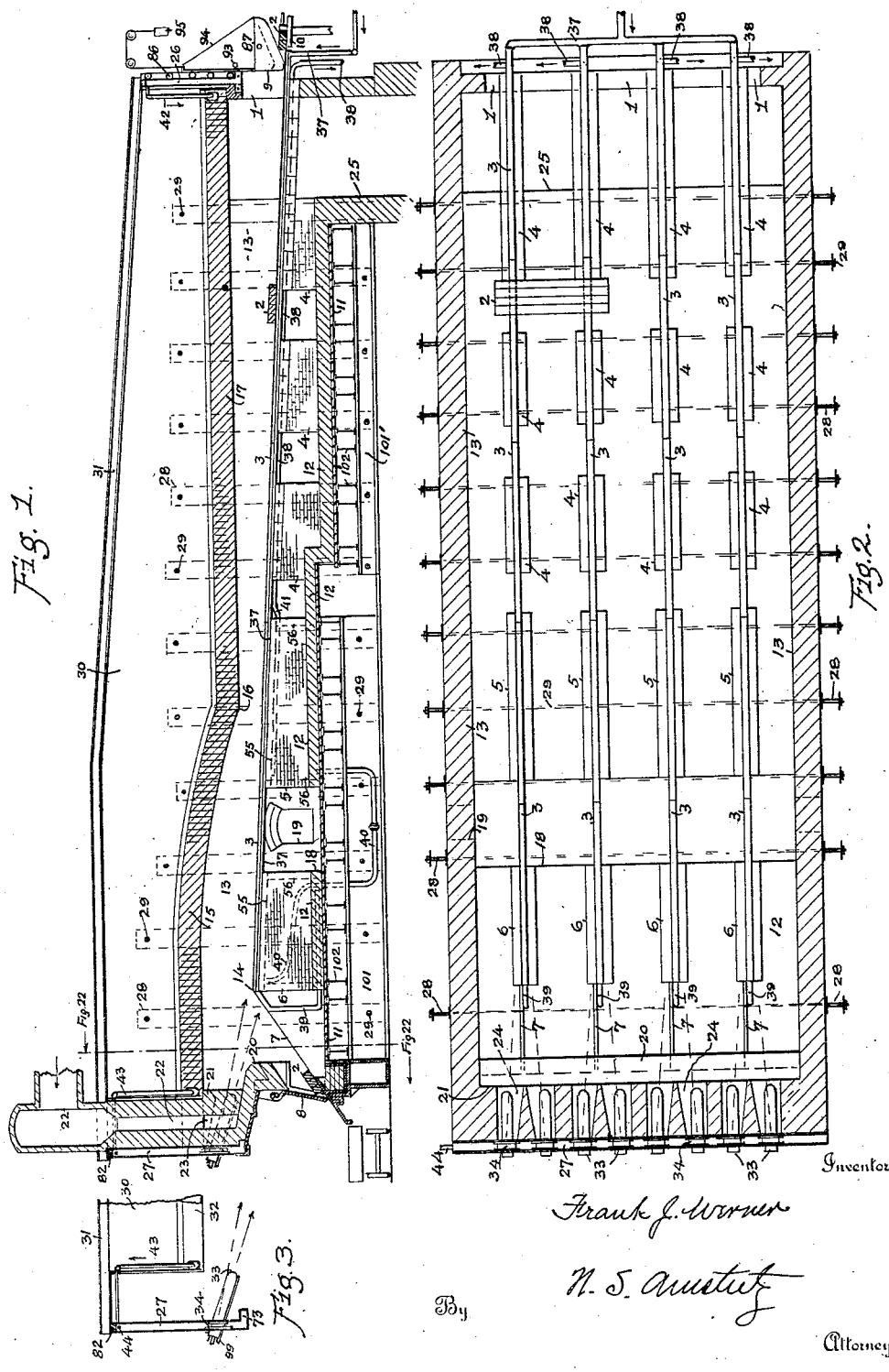

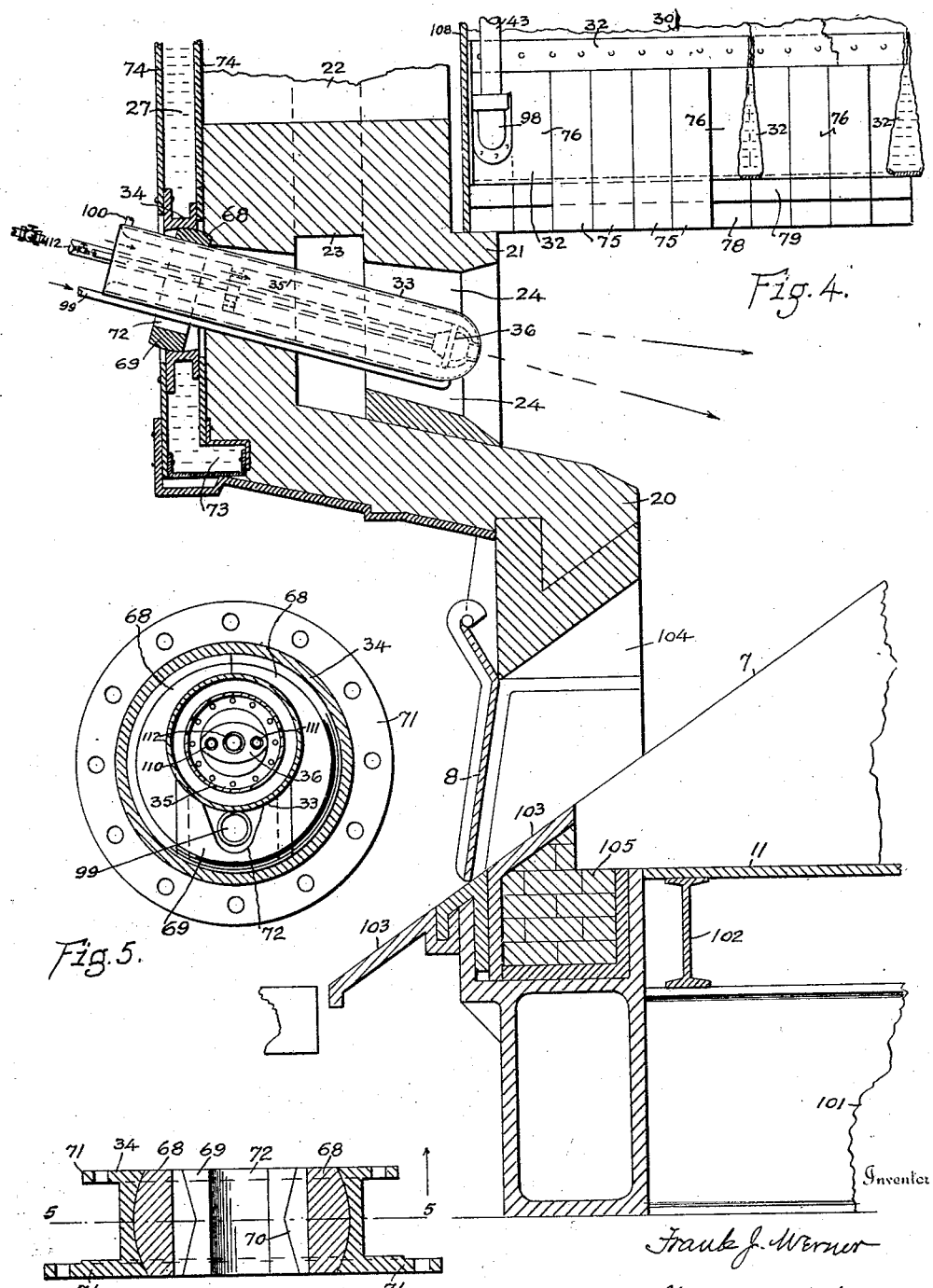

Aug. 26, 1930.   F. J. WERNER   1,774,306
CONTINUOUS HEATING FURNACE
Filed March 17, 1926   5 Sheets-Sheet 3

Aug. 26, 1930.    F. J. WERNER    1,774,306
CONTINUOUS HEATING FURNACE
Filed March 17, 1926    5 Sheets-Sheet 4
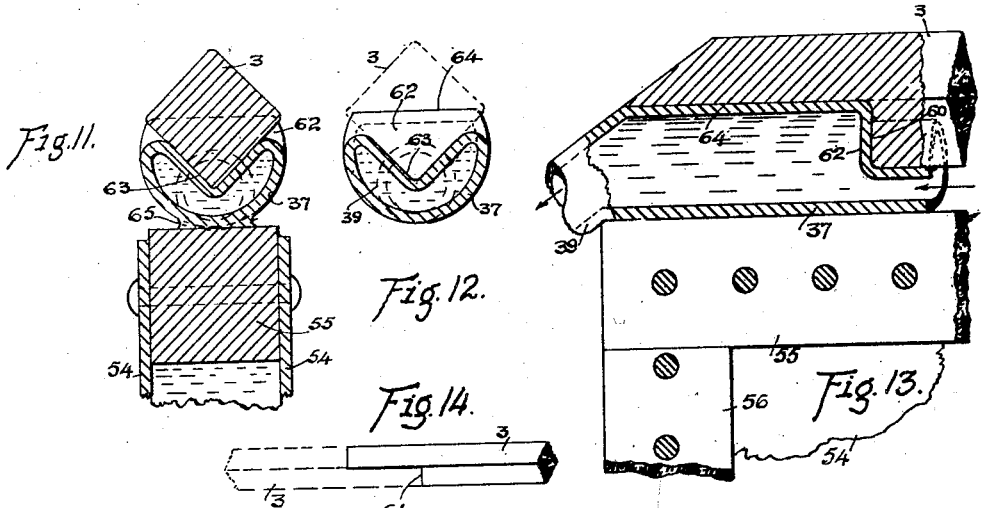
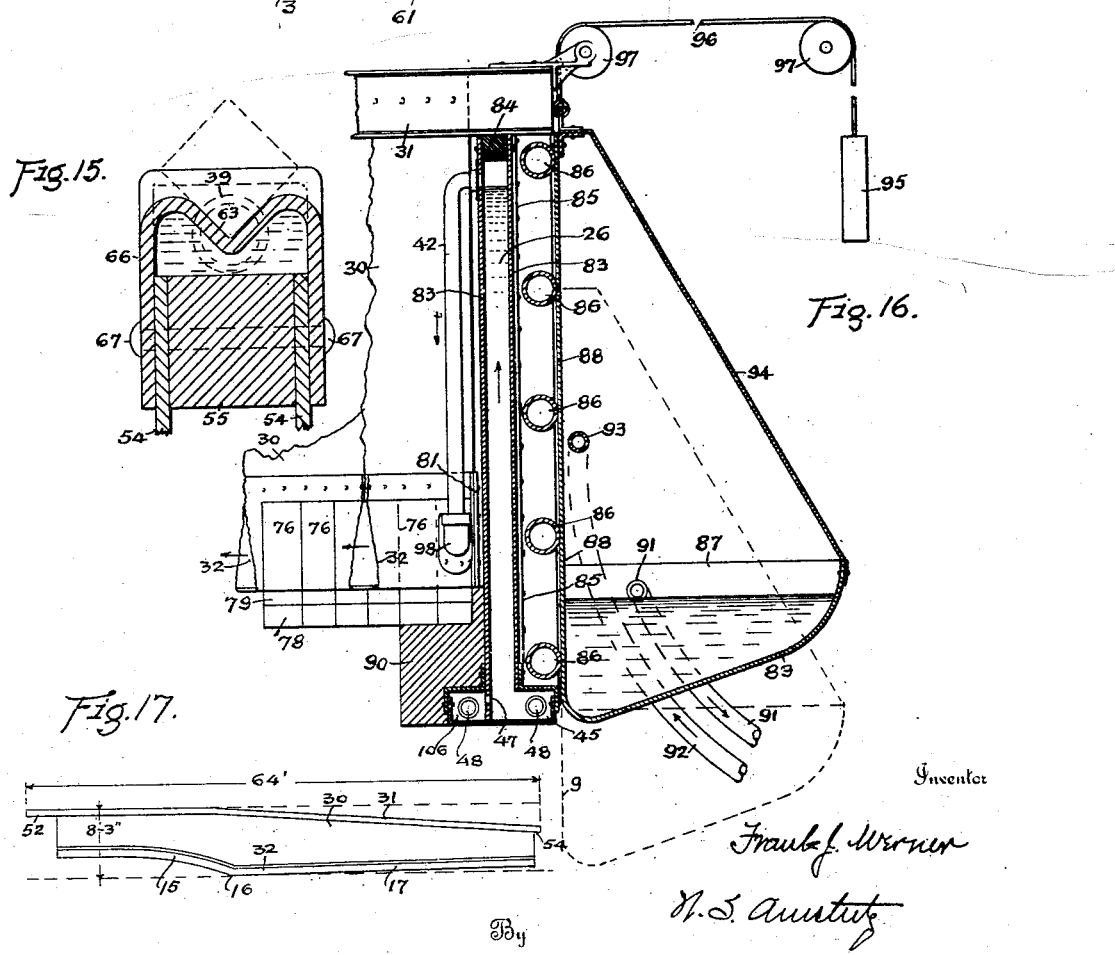

Aug. 26, 1930.  F. J. WERNER  1,774,306
CONTINUOUS HEATING FURNACE
Filed March 17, 1926  5 Sheets-Sheet 5
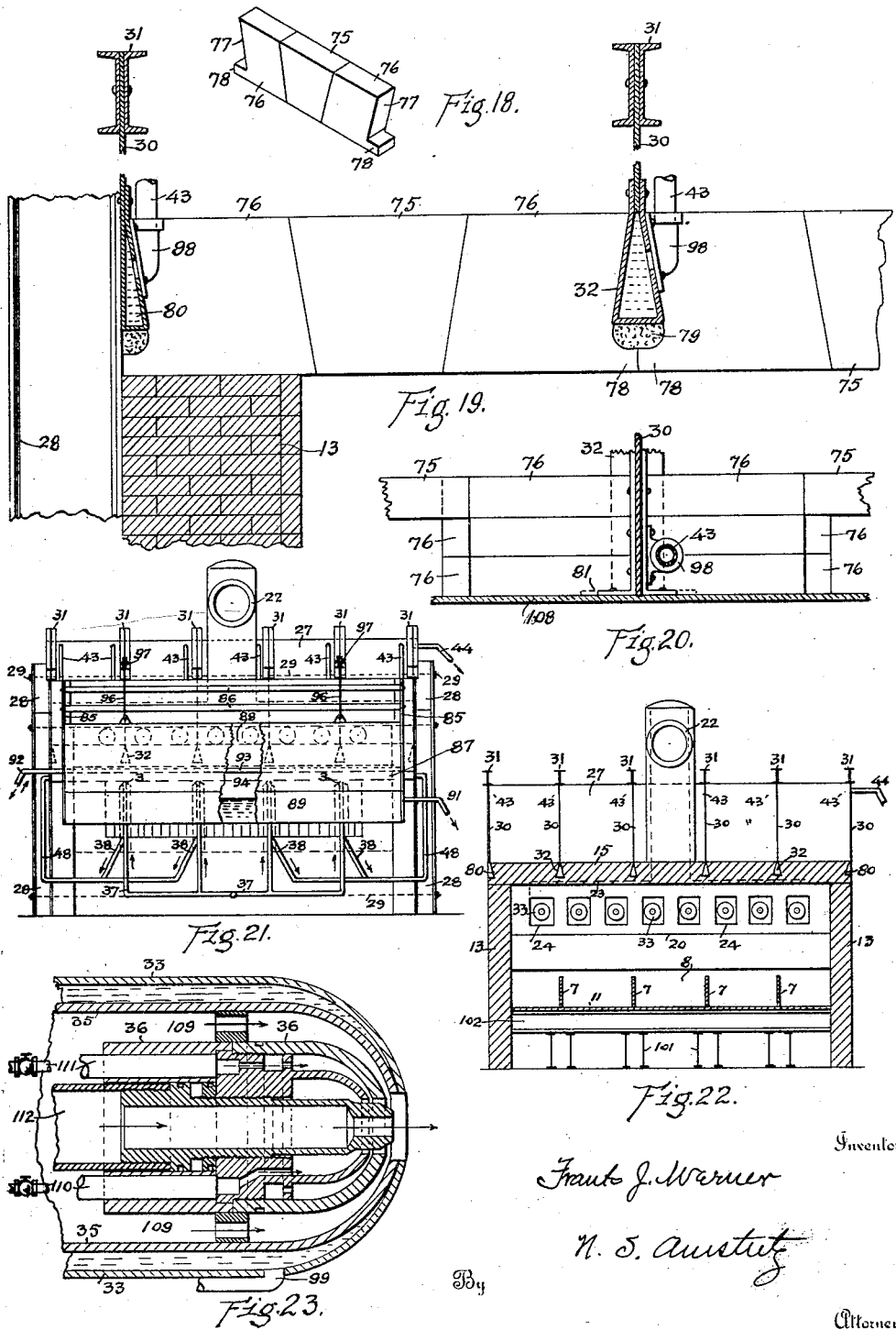

Patented Aug. 26, 1930

1,774,306

UNITED STATES PATENT OFFICE

FRANK J. WERNER, OF PORTER TOWNSHIP, PORTER COUNTY, INDIANA

CONTINUOUS HEATING FURNACE

Application filed March 17, 1926. Serial No. 95,221.

My invention relates to improvements in continuous heating furnaces and it more especially consists of the features pointed out in the annexed claims.

The purpose of my invention is to provide a continuous heating furnace for the heating of billets in a more efficient manner than has heretofore been possible; that combines an improved form of skids, skid supports, and heat control through universal burner units; that provides a replaceable roof structure and a circulatory cooling system which serves the skids, front wall, rear wall and the roof girders; that also provides a method for cooling the entrance gate; that provides an automatic gravity control for the entrance gate; that sectionalizes the skid supports forming those nearest the greatest heat with hollow chambers in which a cooling agent circulates; that makes provision for directing the heat, as needed, to different points of the last skid supports; that utilizes detachable and self-positioning skid bars; that provides a flat instead of an arched roof to secure greater fuel efficiency; that also secures a concentration of heat by bringing one point of the roof close to the skids; and that avoids the formation of "cool spots" on the underside of the billets heretofore found present in furnaces which support the billets directly on pipes carrying the cooling medium.

In addition, I also provide skew back side supports for the roof structure which are external of the furnace walls. Provision is made in the shaping of the roof fire brick so that repairs can be made at any point without dismantling the furnace.

A further advantageous feature is found in the use of universal burner units which, without change in construction, will function equally well with different kinds of fuels, such, for instance, as pulverized coal, gas or liquid fuels. This feature, in connection with means for adjusting the burners in varying directions associated with my improved replaceable skid bars and their supports, gives me a unique advantage over all other forms of existing furnaces.

With these and other ends in view, I illustrate in the accompanying drawings such instances of adaptation as will disclose the broad underlying features of my invention without limiting myself to the specific details shown thereon and described herein.

Figure 1 is an elevation in longitudinal section through the center of a furnace.

Figure 2 is a plan view of portions of Fig. 1 with the roof removed.

Figure 3 is a detached elevation of the rear end of a roof girder and its support.

Figure 4 is an enlarged sectional elevation through a burner opening showing a burner tube in its universal housing and the adjacent parts of the roof structure and the delivery gate.

Figure 5 is a front elevation of the burner housing, burner tube, etc.

Figure 6 is a plan view in section of Fig. 5.

Figure 11 is an enlarged elevation in cross section of a skid bar and its supporting tube.

Figure 12 is an elevation in section of a skid bar tube.

Figure 13 is a side elevation in section of Fig. 11, showing the delivery end of a skid bar stop and the cooperating part of the supporting tube.

Figure 14 is a detached side elevation of the joining ends of a pair of skid bars.

Figure 15 is an elevation similar to Fig. 11, showing a modified form of skid bar supports.

Figure 16 is an elevation in section of the front end of the furnace with its automatically actuated gate in raised position.

Figure 17 is a detached side elevation of a roof girder drawn on reduced scale but in proportional dimensions.

Figure 18 is a perspective view of a group of roofing brick.

Figure 19 is an elevation in transverse section of a part of the furnace roof resting on one of the side walls.

Figure 20 is a plan view of a portion of Fig. 19.

Figure 21 is an elevation of the front end of the furnace.

Figure 22 is an elevation in section on line 22 of Fig. 1, showing the inside of the rear end of the furnace.

Figure 23 is an enlarged elevation in section of the front end of a burner tube with one of my unitary burner units in position.

Figure 7:
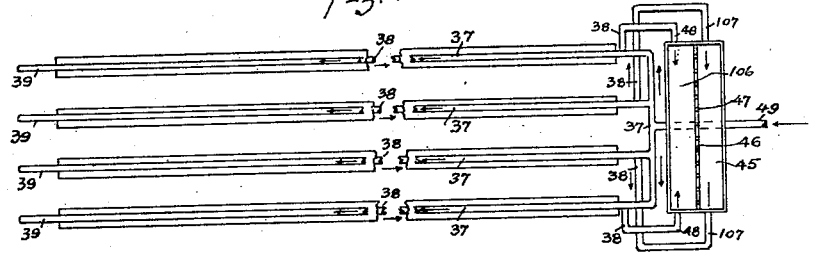
Figure 7 is a diagrammatic plan view of the skid and front and cooling system.

In constructing my furnace I may use any alternatives in construction that different exigencies or varying conditions of practice demand, without departing from the broad scope of my invention.

A subgroup of I beams 101 of considerable depth is placed on a suitable solid base of the rear half of the furnace, and another group of I beams 101' of less depth is placed on a similar base at the front end of the furnace. These floor supports 101 are placed lengthwise of the furnace, and on top of them transerve I beams 102 are placed underneath a metal plate floor 11. On top of the plates 11 a fire brick floor 12 is built to extend from near the rear end 105 to the flue outlet 25 at the front of the furnace. The floor 12, because of the rearwardly ascending incline of the skids 3 and their supports 4, 5 and 6, drops onto a lower level toward the front end of the furnace, as shown in Fig. 1.

A group of four rows of skids is shown in Fig. 2. These are enclosed on the sides by walls 13, a hollow front end 26, a hollow rear wall 27 and a roof 15, 17. At the front end a counterbalanced water cooled self-closed gate or door 87 covers the entrance 1 of the furnace. Beneath the rear hollow wall 27, a transverse wall 20 is built from side to side. In this wall 20 a delivery opening 104 is formed. It is closed by a self-closing gravity gate 8 reaching across the width of the furnace above the downwardly inclined delivery chute 103. A group of plates 7 set on edge and shaped at an angle connect the delivery chute 103 with the last skid support 6, so that the billets 2 will slide through the delivery opening 104 by gravity, automatically raising the door 8 as they pass thereunder. From this point they are transferred in any suitable manner as desired. The billets are pushed through the furnace by any hydraulic or other means located in front of the furnace where they are brought on suitable traversing trucks (not shown). An external billet support 10 stands in front of the face 9 of the opening 1. The billets 2 are pushed across this in any desired grouping toward the furnace. As they engage the inclined underside of the counterweighted door or gate 87 it is raised vertically to permit the billets to pass under it. As soon as a group of billets has been pushed into the furnace from beneath the door 87, its excess weight automatically drops it into a closed position, thus preventing a needless escape of the furnace heat.

At the rear end of the furnace a group of fuel burners 36 is placed, two to each skid, in supporting tubes 33 which have free angular movement in the semi-spherical rings 68 supported in the castings 34 secured in openings formed in the hollow rear wall 27. The burner tubes 33 pass through a transverse air duct 23 and project into enlarged openings 24 formed in the transverse wall 21. These openings permit of lateral and vertical adjustments of the burner tubes 33 to direct the heat above the billets or below them as they approach the highest point 14 of the skids while passing through the furnace. An external air flue 22 connects with the ducts 23 to deliver free air to all the burners, externally of the tubes 33.

The rear end 15 of the furnace roof curves downward to the point 16 to hold the heat as near the billets as possible, so as to conserve fuel and secure a more uniform distribution of the heating of the billets. From this point forward the roof 17 may be inclined slightly upward, if desired, to allow extra expansion room for the flue gases. The roof is not arched crosswise of the furnace. This effects a great saving in fuel. It rests on the side walls 13 and is supported throughout its length by means of plate girders 30, which are suspended from channels 31 placed back to back with the plates 30 between them. The channels and plates are riveted or electrically welded or secured to each other in any other manner. Skew backs 28 placed on the outside of the side walls 13 support the roof in a transverse direction, by means of tie rods 29 passing across the furnace structure near the upper and lower ends of the skew backs. Each skew back may be formed of a pair of channels placed back to back with the tie rods held between them by suitable washers and nuts or I beams, or any other sidewise supporting structure may be used.

A great disadvantage heretofore existent in continuous furnaces has been the short life of the skid supports, the early breaking down of the roof structure, the damage to the front and rear faces of the furnace by the high temperature required to heat the billets. Furnaces have been constructed with hollow skid bars through which a cooling agent circulated. These in a measure prolonged the life of the skid but did nothing to prevent the skid supports from going to pieces under the intense heat required in furnaces of this type. In addition, the most serious defect of hollow skids is found in the formation of "cool spots" on the under side of the billets where they rest on the cooled skids. Furthermore, there has not been provided heretofore any means for selectively directing the heat so as to be concentrated above or below the billets.

Arched roofs are extremely wasteful of fuel because of the height necessary to form the arch. This difference in height of the roof above the billets concentrates the heat along its center and prevents a uniform distribution of heat across the furnace width. In addition, this intense heat at the crown of the arch soon causes the roof to break away which necessitates the shutting down of the furnace, and not infrequently dismantling the whole roof to make repairs. In a similar way any damage to a hollow skid causes a shut down.

I overcome the foregoing difficulties by means of the structure exemplified in the accompanying drawings. The outstanding shortcomings of the ordinary type of skid supports are also entirely eliminated by my structure.

On top of the floor plate 11 the fire brick floor 12 is laid, and on this (Fig. 9) the protective brick veneer 58 is built up alongside of the hollow skid supports 5 and 6. These skid supports comprise bottom or base plates 53 which rest on the floor plate 11, sides plates 54, vertical separating bars or end members 56 to which the side plates 54 are riveted, also a top separating member 55. The side plates are held on the base plates 53 by angles 59. These side plates are protected against the intense heat to which they are subjected by a facing 57 of silica brick covered by ordinary fire brick 58. The inclined delivery plates 7 may be a continuation of one of the side plates 56, if desired, or they may be secured to the side plates in any suitable manner.

The skid supports 4 (Fig. 1) farthest removed from the most intense heat may be built up solidly of fire brick and be topped with any desired specially formed brick in which the outgoing and return pipes 37 and 38 are supported. As these latter brick may be varied almost indefinitely, they are not shown in detail.

Figure 8:
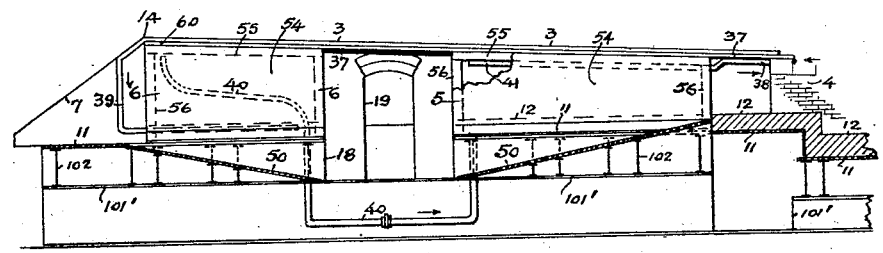
Figure 8 is an elevation in section of a sloping floor and slag clean-out.

The skid support 5 is constructed in substantially the same way as the support 6. These supports are separated by a transverse channel 18 into which the scale may be scraped for removal through the openings 19 formed in the side walls 13. If desired, I may slope the floor between the different skid supports 5 and 6, as shown at 50 of Fig. 8, toward the channel 18 to assist in more easily collecting the scale.

Each skid 3 rests loosely on top of a specially formed hollow supporting member, such as a channel 66 or pipe 37 (Figs. 11 and 15), which extends practically the full length of the furnace from the entrance 1 to the inclined delivery plates 7. The hollow skid supports 37 rest on the top members 55 of supports 5 and 6 where they are held by spot welding at 65 or otherwise. These pipes have a V shaped depression 63 formed on their upper side in which the square shaped skids 3 are loosely placed. At the rear end of the pipes 37 (Figs. 10 and 13) stop shoulders 62 are formed against which the skid shoulders 60 abut, thus serving to hold the skids 3 against endwise movement as the billets 2 are pushed over them.

Figure 9:
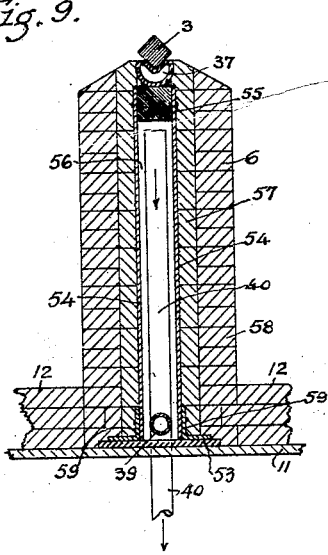
Figure 9 is a cross section of a hollow skid support.
Figure 10:
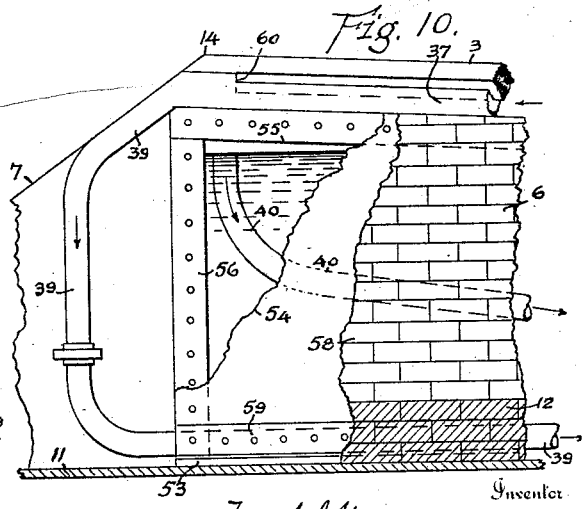
Figure 10 is a side elevation, partly in section, of Fig. 9.

The skids 3 at their extreme rear end are cut away so as to rest on top of the flattened portions 62 of the pipes 37, as shown in Figs. 12 and 13. Pipes 37 are welded or otherwise connected at their rear ends to downwardly inclined pipes 39 which are located alongside the delivery plates 7 (Fig. 10). From here they enter the hollow supports 6 and pass along the bottom in a forward direction terminating near the front end of the skid support. Overflow pipes 40 are placed in each one of the skid supports 6. (Figs. 1, 9 and 10.) They vent the interior of supports 6 from their highest point and pass in a downwardly curving direction through the interior of these supports, and are led out through the base plates 11 and pass through under the channels 18, rising again to enter the rear ends of the skid supports 5 at the bottom of each one (Fig. 1). From the topmost point of the interior of skid support 5 an overflow pipe 41 passes beneath the upper member 55 and out at the front end of the support where it passes upward against the underside of the skid pipe 37, thence continuing toward the front end of the furnace as return pipe 38.

All the skid pipes 37 are fed from any suitable pipe 49. Fig. 7 shows how these pipes may be connected with reference to the cooling system of the hollow front wall 26, which has a hollow base extending the full width of the furnace. This base is divided into two chambers, 45 and 106, by a partition 46 which is perforated by holes 47 so as to allow free circulation of the cooling water. The return pipe 37 of the two outside skids terminate in the chamber 106, one at each end, through pipes 48, and the return pipes 37 of the two inner skids terminate in the chamber 45, one at each end, through pipes 107 (Figs. 7 and 16).

The cooling agent, water or otherwise, enters through pipe 49, passes into the skid pipes 37, to the highest points 14 of the skids, down through pipes 39 into the bottom of skid supports 6 filling these supports. From the highest points it uses pipes 40 to pass beneath the channel 18 and into the bottom of skid supports 5, filling these, and then forward beneath the pipe 37 supported by three skid supports 4 which are disconnected from each other, to the entrance of the furnace where connecting pipes lead the water to the foot of the hollow front 26 as already described.

The circulating water fills the hollow front 26, overflows through pipes 42 and connectors 98 into the hollow triangular roof supports 32 and 80 which extend the full length of the furnace. At the rear end these hollow supports are connected to pipes 43 by connectors 98 and the water is led into the top of the rear hollow wall 27, from which after the support is filled it may overflow at 44 into the drain. The hollow supports 32 and 80 are riveted to the girder plates 30 or they may be secured thereon in any other way. (Fig. 18.)

The hollow front wall 26 and the hollow rear wall 27 both extending from side to side of the furnace are formed of metal plates, which at the top and sides are separated by bars similar to the bars 55 and 56 of the skid supports 5 and 6. At the front end the plates 83 are thus separated by bars 84, and at the rear end the plates 74 are separated by bars 82. A foot 73 also extending the full width of the furnace affords increased circulation to the rear end 27. These hollow ends are of course made water tight and the front 26 may be supported on the side walls 13 or it may extend laterally from the side walls and be independently supported, if desired, in any suitable manner. The rear end 27 is held in place by the girders 30, channels 31, and hollow supports 32, which with the roof rest on the cross wall 21. It is also supported by means of the under wall 20 to which it is secured in any desired manner.

Reverting to the hollow roof supports 32 and 80, these may be joined at the rear end by a transverse plate 108 (Figs. 4 and 20) which hold the girders spaced apart and also serves to close the ends of the hollow supports. These supports may also be closed by plates 81. By reason of the triangular cross section of these roof supports, I am able to use self-locking standardized fire brick between them (Figs. 18, 19). These brick are made in groups of three,— two end brick 76 and a "key" brick 75. All the brick in the roof are duplicates of these, in this same ratio. They are shown in plan view in Fig. 20 and in perspective view in Fig. 18. The end bricks 76 are beveled at 77 to conform to the sides of the hollow supports 32 and 80. They have projecting toes 78 which engage similar toes of the brick on the other side of each support 32 forming a hollow space 79 above the toes 78, and beneath the supports 32 and 80, into which any kind of a non-conductor of heat may be placed. From this description and Figs. 18, 19 and 20, it will be seen that the roof is self-locking by reason of the beveled sides of the side supports 80 and the center sides of the side supports 80 and the center supports 32. In the side supports the girder plate 30 may be bent back onto itself, as shown on the left hand side of Fig. 19 where a skew back 28 is shown alongside. The first row of brick 76 along each side of the furnace rests on a side wall 13. The triangular roof supports 32 in cross section may be formed of a single plate that is bent back "onto itself" so as to receive a girder plate 30 between the adjacent edges of the support 32, as shown in Fig. 19.

A modified form of "skid pipe" is shown in Fig. 15. In this a plate 66 is bent lengthwise to form a V-shaped groove in its upper face and leave its depending edges spaced apart so as to engage the outside faces of the plates 54. Rivets 67 may hold these onto the members 55 in a water tight manner. The removable square shaped skid bars 3, as already stated, are placed loosely in the grooves 63 formed in the tubes 37 and their modification 66. They may be made of any desired length and where the ends meet they may be cut away half and half, as shown in Fig. 14, to form abutting shoulders 61. This construction simplifies the replacement of damaged skid bars. The defective bar is removed and another dropped into its place without having recourse to any fastening means whatever.

The girders 30, by means of their attached channels, rest on the front wall at 54. (Fig. 17) and these channels are attached to the rear wall at 52, (Fig. 17). At the front end of the roof 17 its brick may rest on a transverse wall 90 which protects the foot 106 of the front wall 26. One or more of the channels 31 may project forward of the wall 26 to form supports for the sheaves 97, over which the door cables 96 pass. A second sheave 97 for these cables is shown diagrammatically, above the counterweights 95, in Fig. 16. These cables are attached to the upper edge of the self-closing door 87 whose weight is just enough in excess of the counterweights 95 to automatically lower the door after a group or a single billet has been shoved thereunder.

This door extends somewhat beyond the full width of the furnace opening 1 and it comprises a backing sheet 88, forwardly and upwardly inclined bottom 89, suitable sides, and a cover 94. A perforated pipe 93 extends from side to side about midway of the height of the plate 88. It is placed close to the plate 88 with its perforations facing that way. An overflow pipe 91 is attached to one end of the door. The inclined bottom 89 forms a trough to hold the water which sprays from the pipe 93 down the front of the door plate 88 to keep it cooled. A leading-in pipe 92 (Fig. 21) supplies water to the pipe 93. In order that the door 87 may be easily raised and lowered a group of rollers 86 are placed between end angles 85, and the door plate 88 rides against these rollers as it slides up and down. The lowered position of the door is shown in dotted lines on Fig. 16, from which it is seen that the closing face 9 of the door is directly opposite the volume of water in the trough which insures that this part of the plate 88 will be protected against the heat of the furnace.

To convey some idea of the size of a furnace of this type approximate dimensions of a roof girder are shown in Fig. 17, that shows a depth of about eight feet and a length of sixty-four feet, which dimensions are, however, subject to change as the varying conditions of practice demand.

In furnaces of this kind it is quite important that they be made as near universal as possible, in the matter of continuity of operation, availability for repairs etc., and adaptability in the efficient use of the heating burners with different fuels, and the adjustability of such burners to direct the heat as needed.

The adjustability of the burners up and down and laterally is accomplished by means of "spherical" rings 68, already partly described. The outer burner tubes 33 fit tightly in these rings (Fig. 4). They extend from outside the rear wall 27 almost to the inner face of the wall 21. Between the inner tubes 35 and the outer tubes chambers are formed in which water circulates to cool the front end of the burners 36. This circulation is maintained by feed pipes 99 (Figs. 4 and 5) that pass through openings 72 in the ring members 69 and enter the water chambers near the front ends of the tubes 33, at their lowest point. An overflow is provided at 100, the highest point of each outer tube 33.

The one-piece casting 34 has a "spherical" opening in which the sectional ring 68 has frictional movement. It is riveted or welded by its flanges 71 to the plates 74 so as to make a water tight joint for each casting. In order to assemble the ring 68 in the casting 34 it is made in three parts,—two side portions (Figs. 5 and 6) and a bottom portion 69 which serves to hold the three parts against falling out. In case additional friction is required to hold the ring 68 in different adjusted positions the slip-in part 72 may be shimmed on its beveled faces 70 as needed. The two halves of the ring are first placed in the casting so as to touch each other, then the beveled piece 72 is dropped into place into the open space between the lower portion of two sides of the ring, after which the tube 33 is pressed into the ring to its required distance.

The burners 36 (Fig. 23) are unique in that they are adaptable without change to three different kinds of fuel, such as pulverized coal, liquid and gas fuels. This is a basically important feature that serves at all times to actually make the operation of my furnace continuous, because the stoppage of any one of the fuel sources does not compel me to shut down the furnace with its attendant loss. I simply change from one fuel to another without delay and thus secure a most valuable result in continuous operation, which without these unitary burners could not be attained with the required celerity to make continuity practicable.

The endwise position of the burners 36 in the tubes 35 is independent on the volume of heat desired. When in the position shown in Fig. 23, the volume of heat will be the least. As more heat is needed the burners will be drawn away from the front end of the tubes 33 and 35 to a greater or less distance.

Whenever gas alone is used for fuel it is fed into the central tube 112, steam is admitted through tube 110 and the required amount of air is drawn in through the passage 109 which is the inside of tube 35 to mix with the steam and gas and pass through the delivery opening of the outer tube 33 to the ignition point somewhat in advance of the front end of the tube 33.

A change to liquid fuel is effected by simply shutting off the gas supply to tube 112, retaining the steam supply through tube 110, admitting the liquid through tube 111 and the required air will flow through the passage 109 for combustion.

In case a change to pulverized fuel is desired or necessary, the liquid fuel is simply shut off from tube 111, the steam supply continued through pipe 110 and the pulverized fuel is combined with external air through the passage 109 by any suitable feeding means. Stopping the pulverized fuel and substituting liquid fuel through tube 111, or gas through central tube 112, will insure continuity of service.

What I claim is:

1. In continuous heating furnaces, a plurality of raised billet supports comprising hollow structures at the rear end of the supports, hollow connections between the structures of each support, a hollow front end of the furnace, connections from the several supports to the bottom of the hollow front end, a plurality of hollow roof girders, a hollow rear end, and connections between the girders and the ends whereby a cooling agent may continuously circulate in sequence through the hollow passages.

2. In a continuous furnace, a plurality of separate billet skids, a hollow continuous support for each of the skids, and cooperating means between the support and skids to hold the parts in engagement with each other against lengthwise and sidewise displacement of the skids, said means comprising a lengthwise depression in the support on which the skids are loosely seated.

3. In billet skids, a hollow support having a depression in its upper face, a removable billet skid resting in the depression, and a stop in the support adapted to prevent endwise movement of the skid.

4. In a continuous furnace, a walled enclosure having an entrance and an exit, a support comprising a pair of skids extending from the entrance to near the exit, a hollow support under each skid, and a water-cooled compartment under each support at the exit end of the skids.

5. A continuous support for hot ingots comprising a plurality of stationary skid sections having overlapping recessed abutting ends, a hollow lengthwise support adapted to have water circulating therein positioned beneath the sections the configuration of the contacting surfaces of the support and the skid sections serving to prevent their accidental separation sideways leaving them removable without undoing any fastenings.

6. A hollow skid support having a lengthwise depression on its upper face for a portion of its length, and an abutment at the termination of the depression.

7. In continuous furnaces, a sectional roof comprising a plurality of continuous girders extending the full length of the furnace, hollow lower edges of the girders adapted to serve as passages for a cooling agent and interlocking sectional refractory members supported by and between the lower edges of the girders.

8. In continuous furnaces, a sliding furnace door, means for maintaining a cooling agent in circulation against the lower portion of the door subjected to the intense heat of the furnace, a hollow water cooled front end wall having an opening therethrough, rollers between the door and the end wall and means for raising and lowering the door adjacent the opening.

9. In continuous furnaces, a hollow front end wall provided with an enlarged hollow chamber at its bottom, and means for circulating water in the wall and the chamber.

In testimony whereof I affix my signature.

FRANK J. WERNER.